(No Model.)
T. W. SHEPHERD.
POINTER FOR INDICATING APPARATUS.
No. 340,009. Patented Apr. 13, 1886.
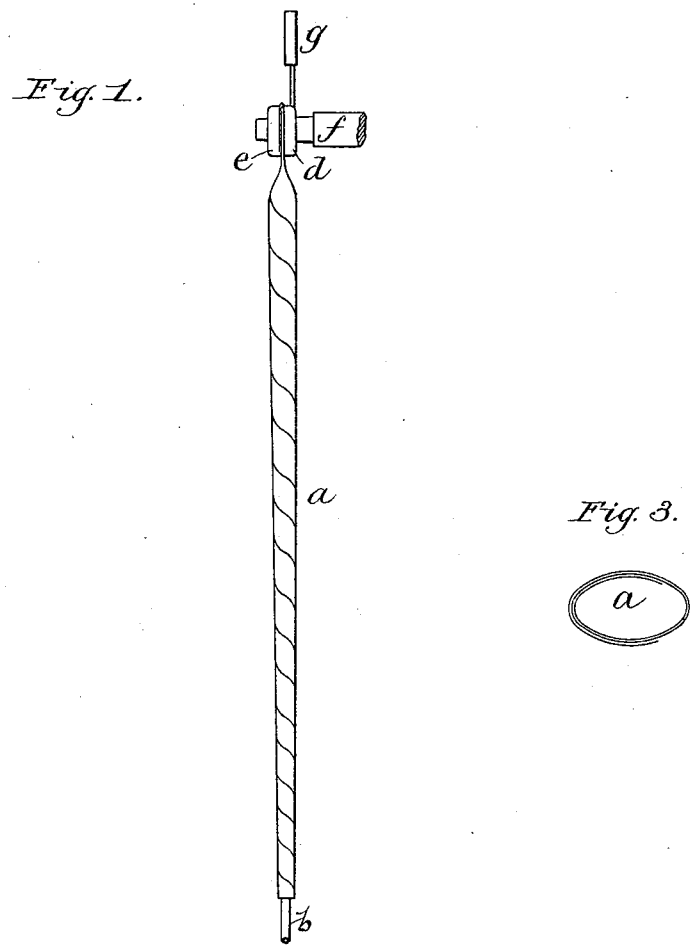
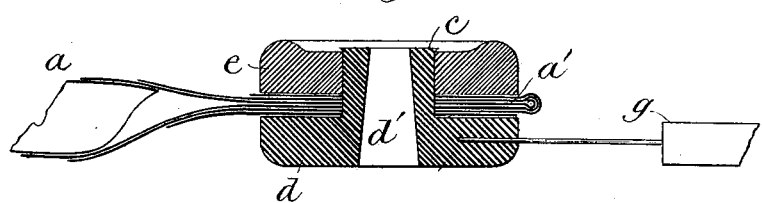
Witnesses.
J. J. Maloney.
H. P. Bates.
Inventor
Thomas W. Shepherd
by Jos. P. Livermore,
Att'y.

UNITED STATES PATENT OFFICE.

THOMAS W. SHEPHERD, OF PEABODY, MASSACHUSETTS.

POINTER FOR INDICATING APPARATUS.

SPECIFICATION forming part of Letters Patent No. 340,009, dated April 13, 1886.

Application filed December 26, 1885. Serial No. 186,773. (No model.)

*To all whom it may concern:*

Be it known that I, THOMAS W. SHEPHERD, of Peabody, county of Essex, State of Massachusetts, have invented an Improvement in Pointers for Indicating-Instruments, of which the following description, in connection with the accompanying drawings, is a specification, like letters on the drawings representing like parts.

My invention relates to a pointer especially intended for indicators of various kinds—such, for instance, as pressure-gages or thermometers—of that class in which the expansion and contraction of a solid material is caused to move a pointer, the object of the invention being to produce a very light and at the same time rigid pointer, which is also of suitable size and of ornamental appearance.

The invention consists, essentially, in a pointer composed of a thin strip of material, preferably aluminum, rolled spirally to form a tube and provided at or near its end with suitable means for attaching it to an arbor connected with the sensitive device or mechanism by which the pointer is to be moved. The pointer may also be provided with various accessory devices, if desired.

Figure 1 is a side elevation of a pointer embodying this invention; Fig. 2, an enlarged section of the end to be connected with the arbor, and Fig. 3 a detail to be referred to.

The main portion $a$ of the pointer is composed of a thin strip of material rolled spirally, as shown, to form a long tapering tube, which may be provided at its smaller end with a solid wire or rod, $b$, inserted within the tube for a short distance, and properly shaped or finished to co-operate with the graduations of the dial with which the pointer is to be used. A pointer of this kind may be made of a strip of aluminum about one-thousandth of an inch in thickness and three-fourths of an inch wide for a pointer six or eight inches in length, and such a pointer will be found to have sufficient strength and rigidity, although of extremely small weight, so that it will be much less affected by jar or vibration than the solid metal pointers commonly used on steam-gages and similar instruments.

In order to attach the pointer to the arbor by which it is to be turned, the walls of the tube are flattened for a sufficient distance from the larger end, and the portion thus flattened preferably turned over or folded back upon itself, as shown at $a'$, Fig. 2, and the layers of material thus compressed into contact with one another are bored or provided with an opening which receives a projection, $c$, of a collet or hub, $d$, upon which the pointer is securely fastened by a washer, $e$, which may be attached to the projection $c$ of the hub in any suitable manner, being, as shown, in this instance fastened thereon by upsetting or heading the upper end of the said projection. The collet or hub $d$ is provided with an opening, $d'$, to receive the arbor $f$, (see Fig. 1,) that is to turn the pointer, and may be fastened to the said arbor in any usual manner. If desired, a counter-balance, $g$, may be connected with the hub $d$, or, if desired, the folded part of the main portion $a$ may extend a sufficient distance beyond the hub to form a counter-balance for the unfolded portion at the other side.

Instead of inserting the tip $b$, the end of the main part $a$ of the pointer may be itself flattened either parallel with the axis of the arbor $f$ when it is desired to give minute indications on the dial or parallel with the dial when it is desired to have the pointer larger so that it can be readily seen at a distance, and the pointer or tube may be somewhat compressed throughout its entire length, or for any desired portion thereof, to make it oval in cross-section, as shown in Fig. 3. A tube formed in this way has great strength and rigidity in proportion to the amount of material used, and does not require soldering or other fastening for the different layers or turns of the strip, which is kept in place and prevented from unrolling by the collet or hub, which connects it with the arbor.

I claim—

1. As an improved article of manufacture, a pointer for indicating-instruments, composed of a thin strip of material rolled spirally and provided at one end with a device for connecting it with the arbor or part from which it is to receive its movement, substantially as described.

2. The combination of the main portion of the pointer consisting of a tube composed of a strip of thin material rolled spirally with a tip inserted in the end of the said tube, substantially as described.

3. The combination of the main portion of a pointer composed of a strip of thin material rolled spirally and flattened at one end, a collet or hub having a tubular projection passing through an opening in the flattened end of the tube, and a washer by which the flattened part of the tube is fastened to said hub, substantially as described.

In testimony whereof I have signed my name to this specification in the presence of two subscribing witnesses.

THOMAS W. SHEPHERD.

Witnesses:
    SAML. C. LORD,
    GEO. HOLMAN.